Feb. 21, 1967  J. DUMPIS  3,305,617

METHOD OF MAKING SEALED PRELUBRICATED PRELOADED BEARINGS

Filed Sept. 20, 1963

INVENTOR.
JANIS DUMPIS
BY

United States Patent Office 3,305,617
Patented Feb. 21, 1967

3,305,617
METHOD OF MAKING SEALED PRELUBRICATED PRELOADED BEARINGS
Janis Dumpis, St. Ann, Mo., assignor to Champ-Items, Inc., St. Louis, Mo., a corporation of Missouri
Filed Sept. 20, 1963, Ser. No. 310,336
2 Claims. (Cl. 264—242)

This invention relates to an improvement in sealed prelubricated bearings for joints of the kind used in an articulated linkage, or the like, and to the method of making a sealed prelubricated bearing for these purposes.

Sealed prelubricated bearings can have particular utility in an articulated linkage not readily accessible for lubrication and, because of its location, are exposed to dirt, dust and water. This sealed prelubricated bearing excludes all foreign matter and retains its lubrication while operating in such an environment. An articulated joint equipped with this improved bearing is especially suited for several automotive applications in suspensions and steering linkages. Such an application usually requires a ball joint, but the bearing, according to this invention, is suitable not only for ball joints but for plain radial and thrust bearings. The ball joint application will be hereinafter described as illustrative of one application of the bearing constructed in accordance with this invention. It will be readily appreciated, however, that this invention can be applied to the simpler forms of bearings heretofore mentioned.

It is characteristic of some bearings, of which a ball joint serves as an example, that a male part is confined within two, or more, female parts making up a female bearing. Thus, manufacture requires the assembly of the two prefabricated female bearing parts around a prefabricated male bearing part. Since an important element in the life of a bearing is concentricity between male and female bearing parts, the assembly, or manufacturing procedures, can become complicated and exacting if this requirement is to be fulfilled. Many bearing structures seek to avoid this problem by using cushions of rubber, or rubber-like molded plastics, between bearing parts. While it is certainly possible to obtain a successful bearing with cushions of rubber-like material between bearing parts, or as a replacement for metal in one bearing part, it is likewise true that a successful product of this kind depends upon wise choice of materials for the rubber-like cushion. Success of this type of bearing depends likewise upon proper procedures and careful attention to detail during assembly. In many instances, improper choice of materials and/or improper procedures have contributed to early failure when the bearing has been put in actual service. This has not enhanced sales appeal for this rubber cushioned type of bearing. It is one of the objects of this invention to provide a method of making and assembling bearings with prefabricated parts so constructed as to ensure actual concentricity between prefabricated bearing parts without the use of complicated equipment to meet the exacting requirements of close tolerance between bearing parts.

The prior art is replete with examples in which the problem of concentricity between bearing parts has been solved by a resilient retainer forming a support for one or another of prefabricated female bearing parts in a joint. The resilient retainer is often arranged to exert a pressure on one of the female parts while supported on the other to hold both parts against a male part in such a manner that the female parts find their own center on the male part. This type of bearing construction is wholly satisfactory in some applications where thrust, or radial load, is applied in but one direction. It cannot be satisfactory where loads must be borne by the joint in all directions, because, when the retainer is spring loaded, a bearing load on the spring causes the spring to yield and there exists, at least temporarily, a looseness between bearing parts causing noise and wear. It is an object of this invention to provide a method of assembly for the bearing parts when so constructed as to ensure maintenance of manufactured bearing clearances regardless of the direction of applied loading to the bearing in the joint.

According to this invention, a round metal prefabricated male bearing part is held between separate prefabricated female bearing parts with hollow round bearing surfaces on the female bearing parts pressed firmly against the round bearing surface on the male part so that all bearing surfaces are concentric. The separate prefabricated female bearing parts are constructed to fit one within the other so as to have substantial clearance therebetween when pressed firmly against the round bearing surface on the male part. If desired, the bearing parts, or some of them, may be initially covered with a temporary coating which will determine a desired and uniform manufacturing clearance in the bearing after the bearing parts are subsequently put in operation. While the bearing parts are firmly pressed together, as above described, the two female bearing parts are secured one with respect to the other in final position by filling the cavity receiving one of the female bearing parts in the other with a thermoplastic, or thermosetting filler. When a thermosetting plastic is used, it is preferably of the kind formed by a mix which contains its own catalyst to provide the heat for solidification. One of the features in the construction and in the method of assembly is the use of a lubricant filler. In the assembly operation, this filler is added first to partially fill the cavity formed by the separation between female bearing parts around the male bearing part to exclude thermosetting filler from securing all of the parts rigidly together.

Other objects and advantages of this invention will appear from the following description which is in such clear, concise and exact terms as will enable any person skilled in the art to make and use the same when taken with the accompanying drawings, forming a part thereof, and in which.

Figure 1:
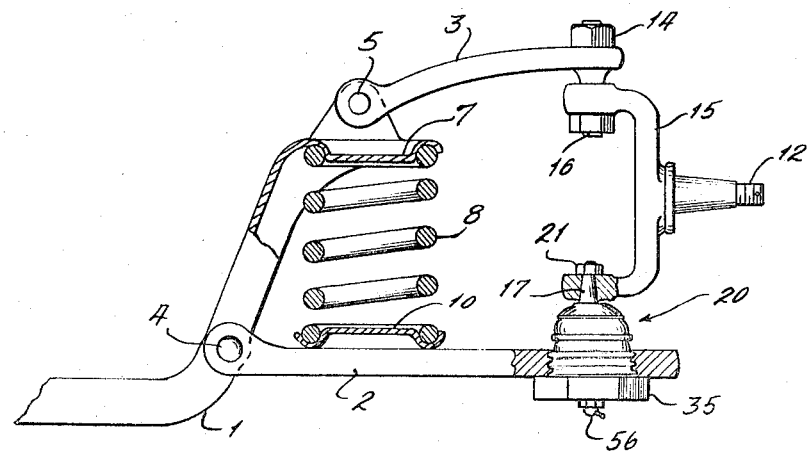
FIG. 1 is an environmental view schematically illustrating the application of a joint in an articulated linkage for automotive use.

FIG. 1 illustrates schematically a portion of an automotive chassis and an articulated linkage for supporting a wheel spindle upon which the wheel of the vehicle is journalled. This linkage is connected by ball joints, as will be later pointed out, which are constructed with bearings according to this invention. A portion of an automotive chassis 1 pivotally supports a lower A-frame 2 and an upper A-frame 3, all in a well known manner. Frame 2 is hinged to the chassis 1 by a pair of spaced bearings 4, one of which is shown. A-frame 3 is hinged to the automotive chassis 1 by spaced bearings 5, one of which is shown. On the chassis 1 is a spring seat 7 against which the upper end of a coil spring 8 rests. On the A-frame 2 is a spring seat 10, and, as will be obvious, spring 8 is compressed between two seats 7 and 10 by the weight of the vehicle on the wheel supported on spindle 12, all in a well understood manner. The upper A-frame 3 carries a ball joint 14 at its outer end. The spindle of the ball joint 14 is secured in an aperture in the upper end of the steering knuckle 15 by a nut 16. The lower leg of the steering knuckle 15 is in turn supported on a spindle 17 of a ball joint 20 held securely in the outer end of the A-frame 10. A nut 21 secures the leg of the steering knuckle 15 to the spindle 17.

The illustration in FIG. 1 will serve to represent a typical wheel mounting for a vehicle.

Figure 2:
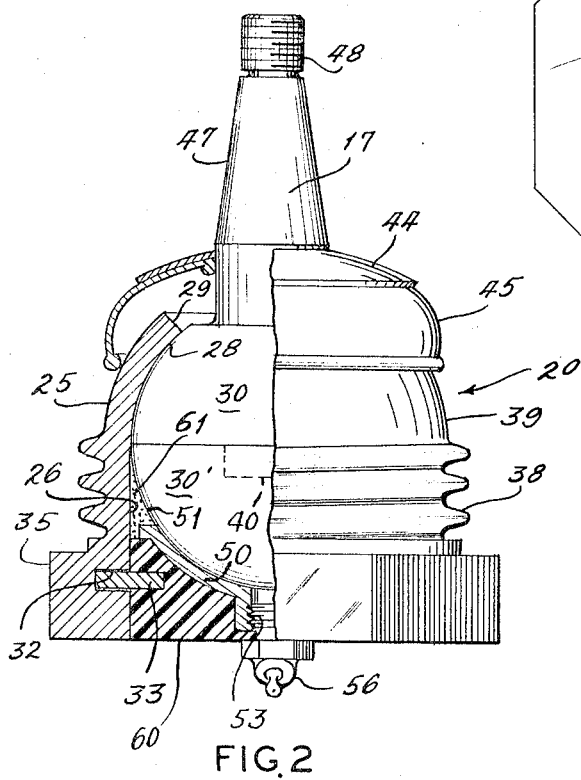
FIG. 2 is a side elevation partly in section illustrating the external and internal construction of a joint, such as shown in FIG. 1, having a bearing constructed in accordance with this invention.
Figure 3:
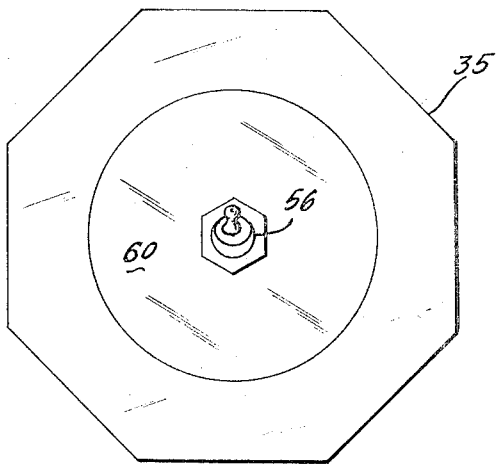
FIG. 3 is a top plan view of FIG. 2.
Figure 4:
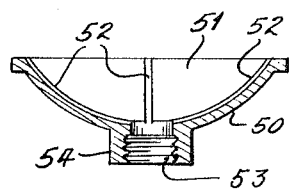
FIG. 4 is a transverse section of a female bearing part illustrated in FIG. 2.

Since this invention is concerned, not with the linkage, but with the bearing construction for a joint in the linkage, the detailed description will be confined to the construction of one of the joints, such as 20. As shown in FIG. 2, joint 20 has a female bearing part in the form of a socket 25 with an internal surface 26 bored out to a cylindrical contour. Preferably, this cylindrical surface, or bore, within the socket 25 extends to, or slightly beyond, the upper half of the male bearing part 30 which is in the shape of a ball. At the end of the cylindrical portion 25 is an internal spherical bearing surface 28 which extends to the circular aperture 29. There is an annular groove 32 cut into the wall of the cylindrical part 26 at the opposite end of the socket 25 from the circular aperture 29. Groove 32 accommodates a split spring metal ring 33 seated in the groove 32 and projecting inwardly from the cylindrical wall 26 of the socket 25. This same end of the socket 25 has an integral externally projecting flange 35 which for purposes of convenience is provided with a series of flats about its periphery for the reception of a wrench. Above the flange, or collar, 35, a portion of the socket 25 is formed with a thread 38 which merges into a spherical casing part 39.

Within the socket 25 is a male bearing part in the form of a ball 30. As shown, the ball 30 is composed of two halves, but this construction is wholly optional. If formed in two halves, one half 30′ is journalled on the other half by a pin and socket connection 40. Stem 17, integrally formed with the ball 30, protrudes through the circular aperture 29 in the socket 25. On the cylindrical portion of the stem 17 is a boot 45 of rubber-like material which has a beaded edge held firmly in engagement with the spherical part 39 on the socket 25 by a metal backing plate 44 which may be secured to the stem 17 in any suitable manner, or held pressed against the boot 45 by a coil spring surrounding the stem 17 and bearing against the connecting linkage. Tapered portion 47 of the stem 17 terminates in a threaded end 48.

Bearing against the surface of the ball 30′ is a second female bearing part or bearing cup 50 containing an internal rounded prefabricated bearing surface which fits with a portion of the rounded prefabricated bearing surface on the side of the ball opposite the stem 17. The rounded bearing surface of the bearing cup contains lubrication passages 52, all of which communicate with a passage 53 in an internally threaded nipple end 54 formed integral with the bearing cup or female bearing part 50. Grease nipple 56 has a threaded end engaged with the threads in the nipple 54.

As will be apparent from the illustration in FIG. 2, the bore 26 of socket 25 forming one of the female bearing parts is of a size to readily accommodate not only the ball 30 but also to accommodate the cup-shaped bearing part 50 in such a manner that a cavity is formed within the socket 25 after the ball and cup are placed within. This cavity is partly filled by a settable resin filler 60 and in part filled by a lubricant filler 61. Filler 60 can be a thermosetting epoxy resin containing powdered metal, or other ingredients, to act as a toughener and enhance durability. The settable resin filler 60 is anchored firmly in place about the spring ring 33. The lubricant filler 61 is preferably powdered "Teflon" (fluorotetraethylene polymer). The filler 61 occupies a portion of the cavity formed within the bore 26 between the male and female parts of the bearing and excludes the filler 60 from this part of the cavity even if injected into the cavity under pressure.

After the joint 20 has been assembled, grease, or other lubricant, can be injected through the fitting 56, passages 53 and 52 into the cavity containing the lubricant filler. The grease, or other lubricant, injected periodically during service of the joint 20 may eventually force out all of the "Teflon" powder, but this is immaterial to the operation of the joint. "Teflon" itself is a lubricant and its purpose is to ensure lubrication of the joint on assembly and exclude the filler 60. The joint 20, therefore, is prelubricated and will retain the lubricant 61, or some of it, whether it is greased or not after being put in service.

Usually the socket 25 is a metal piece, but the cup-shaped female bearing part 50 can be formed of a metal stamping and even of very light gauge metal, or it can be formed of Nylon. In either case, the bearing cup 50 will be adequate to support any imposed load because of its backing 60 which after setting becomes solid and will prevent any distortion of the bearing cup 50 whether made of a light gauge metal, or of a shell of Nylon. Regardless of the composition of the bearing cup 50 (whether of light gauge metal or Nylon), it can be pressed against the prefabricated bearing surface of the ball 30 with sufficient force so as to conform and mate with the smooth surface on the ball 30. Because of the manner in which the joint is assembled, it is not actually necessary to machine the ball contacting surface of bearing cup 50. The assembly pressure can be sufficient to mate the ball contacting surface of bearing cup 50 with cup 50 of the ball 30. This leaves only the surface of the ball to be machined to a smooth accurate surface and, of course, the seat 28 in the female bearing part, or socket, 25.

Joint 20 is retained within the aperture in the arm 2 by the threads 38 and is easily installed or removed from the A-frame 2 by applying a wrench to the flats 35.

Because of the construction of the joint 20, its assembly is readily performed by simple tools because there are no exacting requirements to be fulfilled in order to assemble the joint 20 with the prefabricated female bearing parts 25 and 50 concentric with the prefabricated ball 30. Male bearing part with a prefabricated round bearing surface 30 is inserted into the socket 25 with the stem 17 protruding through the circular aperture 29. Female bearing part 50 containing the grease nipple 56 is then inserted within the female bearing part 25 and pressed tightly (preloaded) against the upper bearing portion on the male bearing part 30 so as to conform the bearing side of cup 50 with a portion of the round bearing surface 51 on the ball 30 while another portion of the rounded bearing surface of the ball 30 is seated on the bearing surface 28. Snap ring 33 is then sprung into the groove 32. With the bearing parts held firmly together in a suitable jig, or the like, the lubricant filler 61 is then injected to fill the cavity between the male and female bearing parts. Thereafter, filler 60 is injected to fill the cavity between the female bearing parts. When the filler 60 has set, the joint 20 can be removed from the jig.

Changes in and modifications of the construction and method described may be made without departing from the spirit of my invention or sacrificing its advantages.

Having thus defined the invention, what is claimed and desired to be secured by Letters Patent is:

1. The method of assemblying a preloaded joint for an articulated linkage having (1) a prefabricated round male bearing part provided with rounded finished bearing surfaces, (2) a first prefabricated female bearing part open at one side and formed internally with a rounded finished bearing surface to mate with a portion of a rounded bearing surface on said male bearing part, (3) a second prefabricated female bearing part of a size to be accommodated within the open side of said first female bearing part and formed with an internal smooth rounded bearing surface to mate with another portion of a smooth rounded bearing surface on said male bearing part, the steps of, (a) inserting said male bearing part within said first female bearing part with a portion of the smooth rounded bearing surfaces on said male part in contact with the smooth bearing surfaces of said first female bearing part, (b) inserting said second female bearing part within said first female bearing part with the smooth bearing surfaces of said second female bearing in contact with a portion of the smooth bearing surfaces on said male bearing part, (c) holding said bearing surfaces on said first and second female parts firmly against bearing surfaces on said male bearing part, (d) providing sufficient pressure to cause said bearing surface on said second female part to generally conform to the surface of said male bearing part, (e) injecting a lubricant filler into said first female bearing part to partly fill the cavity between said bearing parts, and (f) injecting a settable filler to seal the open side of said first female bearing part.

2. The method of constructing a joint for an articulated linkage having (1) a prefabricated round male bearing part provided with rounded finished bearing surfaces, (2) a first prefabricated female bearing part open at one side and formed internally with a rounded finished bearing surface to mate with a portion of a rounded bearing surface on said male bearing part, said open side of said female bearing part having an inside diameter substantially equal to the outside diameter of said male part, with said open side additionally including anchoring means on the inside thereof, (3) a second prefabricated female bearing part of a size to be accommodated within the open side of said first female bearing part and formed with an internal smooth rounded bearing surface to mate with another portion of a smooth rounded bearing surface on said male bearing part, the steps of, (a) inserting said male bearing part within said first female bearing part with a portion of the smooth rounded bearing surfaces on said male part in contact with the smooth bearing surfaces of said first female bearing part, (b) inserting said second female bearing part within said first female bearing part a sufficient distance to leave an open side on said first female part, and to leave a cavity between the male part and the first and second female parts, with the smooth bearing surfaces of said second female bearing in contact with a portion of the smooth bearing surfaces on said male bearing part, (c) holding said bearing surfaces on said first and second female parts firmly against bearing surfaces on said male bearing part, (d) providing sufficient pressure to cause said bearing surface on said second female part to conform to the surface of said male bearing part, (e) injecting a lubricant filler into said first female bearing part to partly fill the cavity between said bearing parts, and (f) injecting a settable filler to seal the open side of said first female bearing part, with said filler being anchored in place within said open side thereby maintaining said second female part conformed to the surface of said male bearing part, and (g) releasing the pressure applied in step (d), after said filler has hardened.

References Cited by the Examiner
UNITED STATES PATENTS

| | | | |
|---|---|---|---|
| 2,454,847 | 11/1948 | Slack | 264—255 XR |
| 2,937,895 | 5/1960 | Langen et al. | 287—87 |
| 3,001,811 | 12/1961 | Haller | 287—87 |
| 3,073,634 | 1/1963 | Gottschald | 287—90 |
| 3,089,198 | 5/1963 | Eierhart | 18—59 |
| 3,094,376 | 6/1963 | Thomas | 18—59 |

ROBERT F. WHITE, *Primary Examiner.*

ROBERT C. RIORDON, ALEXANDER H. BRODMERKEL, *Examiners.*

D. C. CHAMPION, T. J. CARVIS, *Assistant Examiners.*